July 10, 1956 N. G. NOELL 2,754,453

SEPARABLE COMPONENT SUPPORT FOR PLUGGABLE UNITS

Filed Oct. 22, 1952 2 Sheets-Sheet 1

INVENTOR
NEWTON G. NOELL
BY Robert S. Dunham
ATTORNEY

July 10, 1956 N. G. NOELL 2,754,453

SEPARABLE COMPONENT SUPPORT FOR PLUGGABLE UNITS

Filed Oct. 22, 1952 2 Sheets-Sheet 2

INVENTOR
NEWTON G. NOELL
BY Robert S. Dunham
ATTORNEY

United States Patent Office 2,754,453

Patented July 10, 1956

2,754,453

SEPARABLE COMPONENT SUPPORT FOR PLUGGABLE UNITS

Newton G. Noell, Pleasant Valley, N. Y., assignor to International Business Machines Corporation, New York, N. Y., a corporation of New York Application October 22, 1952, Serial No. 316,284

3 Claims. (Cl. 317—101)

This invention relates to a pluggable unit for supporting circuit components. More particularly, the invention relates to a unit for removably supporting certain electrical components associated with a plurality of electron tubes.

It is accordingly an important object of the invention to provide a unit having spaced sets of terminals providing means for the inter-spacial connection of electrical components in such manner that a plurality of such components may be easily and quickly inserted or removed from the circuits of the electron tubes supported by the unit.

The foregoing object of the invention is attained by providing one or more supports in the form of a plate or card upon which electrical components of a circuit may be mounted, so that a substantial part of a circuit may be be easily assembled and handled as a unit. The objective is fully realized by providing terminal contacts on the component support which are adapted to engage corresponding spaced terminals carried by the pluggable unit structure.

In a more specific aspect the invention contemplates a pluggable unit in which is provided a head plate for mounting a plurality of tube sockets and with which is associated a plurality of terminals to which the sockets may be connected. The structure, furthermore, includes a base member with which is associated a second set of terminals. The first and second sets of terminals are maintained in fixed, spaced relation to each other to provide therebetween a space to accommodate one or more component supports which insofar as assembly and handling are concerned are separate structures, but which nevertheless are provided with contact terminals for electrically connecting electrical components mounted on the support and for separably engaging the first and second sets of unit carried terminals.

It is a specific object of the invention to provide a separable component support for pluggable electronic units which can be inserted in the unit frame in only one operative position, thereby avoiding the reversal or improper association of circuit components.

The specific object is achieved by providing interengaging key means on the pluggable unit frame and on the component support which must be brought into registration before the contact terminals of the support can be engaged with those of the unit frame.

These and other purposes, objects and advantages of the invention will appear as the description thereof is read in light of the drawings forming a part of the application, and in which.

Figure 1:
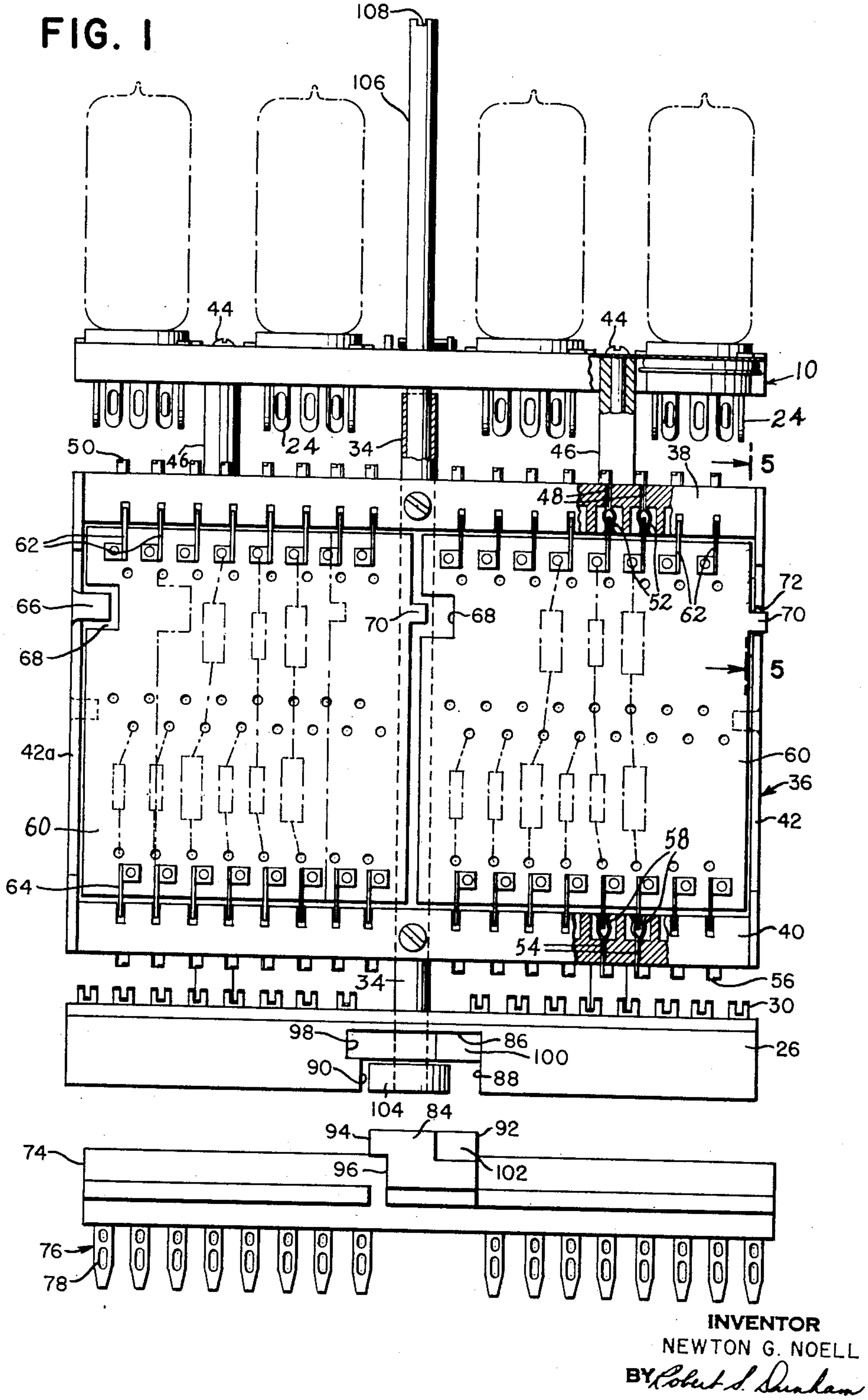
Fig. 1 is a side elevational view of a pluggable electronic unit according to the invention herein.
Figure 2:
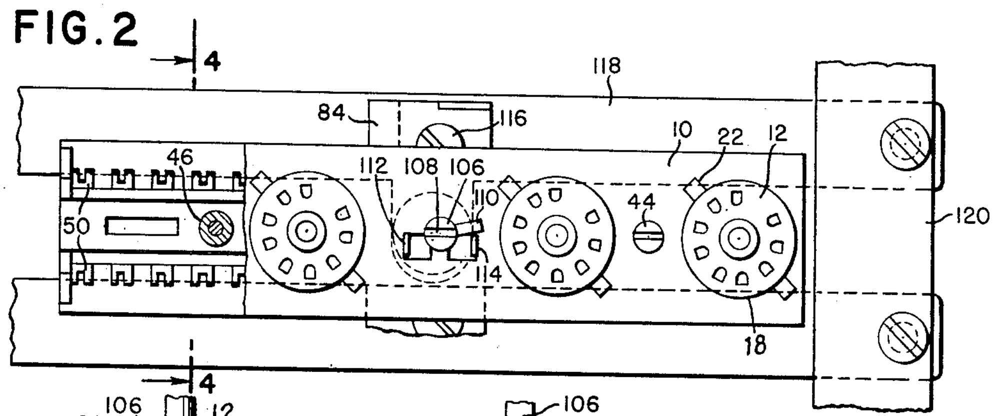
Fig. 2 is a plan view of a pluggable electronic unit according to the invention mounted on a frame member, the frame being fragmentary and parts of the pluggable unit being broken away to show underlying structure.

The pluggable unit structure herein includes a head plate 10, Figs. 1 to 4, which is of sufficient width to accommodate a tube socket 12, Fig. 2. The head plate is of generally elongated structure and has a pair of parallel, downwardly extending, marginal flanges 14, Figs. 3 and 4, along the longitudinal edges thereof.

The head plate 10 is of such length as to accommodate the desired number of electron tube sockets in generally equally spaced array along the length thereof. The unit herein illustrated is sufficiently long to accommodate four tube sockets, although the length of the unit and the number of tubes may be varied to satisfy the demands of the mechanism in which the unit is to be employed.

The tube socket herein employed has a collar or flange 16 by means of which the tube socket is mounted in the head plate 10. The head plate is suitably apertured to accommodate the generally cylindrical upper portion 18, Fig. 4, of the socket. The socket is inserted into the head plate aperture from below until the flange or collar 16, Fig. 3, abuts the inner or under face of the head plate. A securing clip in the form of an annulus 20 having a pair of upstanding ears 22 is adapted to engage the undersides of the tube socket flange 16, the ears passing through appropriate slots in the head plate over which they are bent to contact the outer face thereof for securing the tube socket against displacement.

Each tube socket has a plurality of metallic contact inserts terminating in generally parallel terminals 24 beyond (below as shown) the base of the socket. The terminals 24 provide a point of connection for circuit components to be associated with any one of the tubes.

Figure 3:
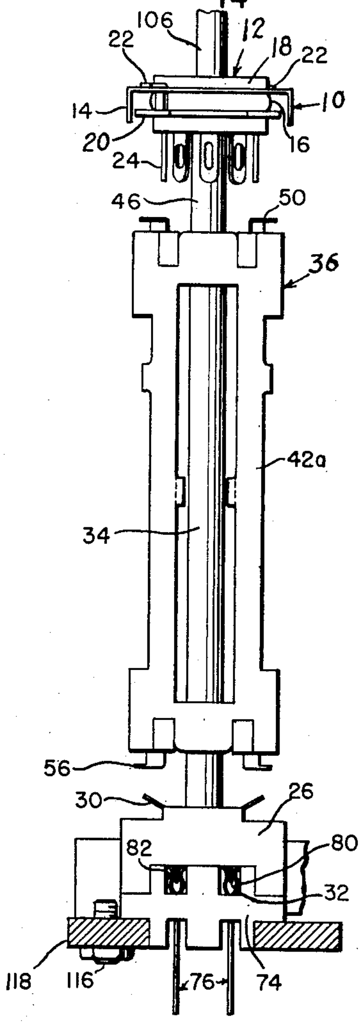
Fig. 3 is an end elevational view of a pluggable electronic unit mounted on a frame member as in Fig. 2.
Figure 4:
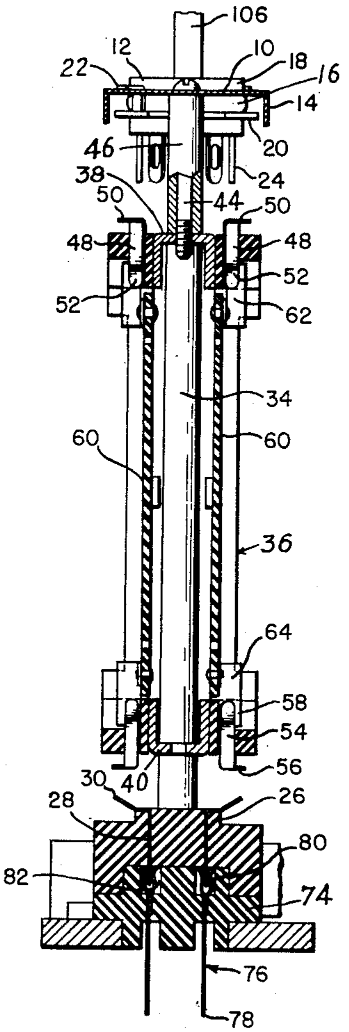
Fig. 4 is a sectional view on line 4—4 of Fig. 2.
Figure 5:
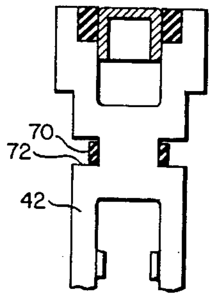
Fig. 5 is a sectional view on line 5—5 of Fig. 1, showing, however, only the upper portion of the unit frame.

Spaced from the head plate 10 is a base member 26 which in this illustrative embodiment is preferably substantially as long and as wide as the head plate 10. A set of terminals 28 is mounted in and along the base member in spaced relation to each other. Each of the terminals 28 comprises a connecting lug 30 extending from the inner (upper as shown in Figs. 3 and 4) face of the base member 26 and a contact pin or blade 32 (Fig. 3) which extends from the opposite (lower as shown) face of the base member. The terminals 28 are preferably disposed in parallel rows along opposite longitudinal edge portions of the base member.

The head plate 10 and the base member 26 are maintained in spaced relation to each other by means of a supporting post 34 which is secured to the base member 26 and is also secured to base and head rails 40 and 38 hereinafter described. The means 44—46 also hereinafter described secure the head rail 38 to the head plate 10.

In order to facilitate the inter-spacial connection of circuit components in the space intervening between the socket terminals 24 and the base member terminals 28, there has been provided herein two sets of terminals, one set in association with the socket terminals and another set in association with the base terminals.

Located between the head plate 10 and the base member 26 is a frame 36 which consists of a head rail 38 and base rail 40 which are rigidly interconnected by means of a pair of end plates 42 and 42*a*, Fig. 1. The frame 36 is maintained in position by means of the post 34 to which it is attached and also by means of a pair of bolts 44 which pass through the head plate 10, and the head rail 38 and the bolts 44 pass through spacers 46 which are interposed between the confronting faces of the head plate and the head rail.

Spaced along the opposite edge portions of the head rail 38 are a plurality of generally equally spaced contact terminals 48 which shall be referred to herein as a first plurality of terminals. Connecting lugs 50 of the terminals 48 extend beyond a face of the head rail 38 so that the socket terminals 24 may be connected thereto as may be required by any given circuit. The inner (lower as seen in Figs. 1 and 4) end of each contact terminal 48 terminates in a bifurcation 52 located in a slotted cavity in the head rail 38 to provide a receptacle for terminal pins of a component support, as to be described hereinafter.

The base rail 40 similarly supports a plurality of contact terminals 54 in generally equally spaced arrangement along opposite longitudinal edges thereof. These base rail terminals shall be referred to herein as the second plurality of terminals. Each of the contact terminals 54 includes a connecting lug 56 to which one of the lugs 30 of the base terminals 28 may be connected in satisfaction of some particular circuit requirement. Each of the terminals 54 terminate at the opposite end in a bifurcation 58 located in a slotted cavity in the base rail 40, thereby providing a receptacle for component support contact pins, as will be pointed out more fully as the description proceeds.

The frame 36 constitutes a receiver for one or more electrical component supports in the nature of a relatively thin, flat card or plate 60 which is form retaining and preferably of good electrical insulating properties. Along one edge (the upper edge, Figs. 1, 3 and 4) of the card are a plurality of contact blades 62 which so extend and are so spaced as to engage the terminal bifurcations 52 of the terminals 48 in the head rail 38. At another edge (the lower edge, Figs. 1, 3 and 4) of the card 60 are a similar set of contact blades 64 which so extend and are so spaced as to engage the terminal bifurcations 58 of the terminals 54 in the base rail 40. Electrical components may be connected between the card contact blades 62 and 64 as may be required, for example as shown in dot and dash lines in Fig. 1.

It will follow from what has been described that the card or plates 60 constitute a separate support for electrical components in that it has terminals for separably engaging the first and second plurality of terminals, i. e. terminals 48 and 54.

The fact that the cards 60 are separable from the frame 36 at once gives rise to the danger that they might be turned end for end and reversely engaged with the head and base rail terminals with resultant damage to equipment and danger to operating personnel. To avoid such reversal, this invention provides a key device having a fixed frame part which must register with a card complement before the card contact blades and the head and base rail contact terminals can be engaged. This key device provides a safeguard against reversal, in that registration between the key complements can be effected in one relative position of the card only, i. e. in the position where properly related contacts may be brought into engagement.

Specifically the key device comprises an inturned finger 66, Fig. 1, extending inwardly from the end plate 42*a* which is adapted to register with a notch 68 formed along one edge of each card 60. Each card in turn has a finger 70 extending outwardly of an opposite end thereof for registration with a notch 72 in the end plate 42. When two or more plates, cards or supports are used simultaneously on one face of the unit as shown in Fig. 1, the card finger 70 of one card will extend into the notch 68 of an adjacent card.

As indicated in Fig. 1 by the generally vertical dot and dash lines on the component support card at the left, each such card may be comprised of several sections if assembly or servicing requirements are facilitated thereby. Furthermore, the number of cards in a frame may vary with the requirements of the device with which the unit is used. Finally, it is also contemplated that separable cards may be used in a frame in conjunction with fixed cards, or that separable cards may be used along one face of the frame only. This also implies that a plurality of terminals may be arranged in but a single line along the length of the head and base rails.

In order to mount the entire unit above described in operative position, there is provided a socket member 74. The construction of this member and its cooperation with the base member 26 as shown in the accompanying drawings and hereinafter described is disclosed in greater detail and is claimed in the copending application of McNutt and Garvey, Serial No. 290,142, filed May 27, 1952, which is owned in common with the present application. The socket member 74 is an element molded of suitable insulating material and has located therein connectors 76 which are adapted to engage the contact pin or blade portions 32 of terminals 28 of the base member 26. In the form illustrated herein, the socket member 74 has two parallel rows of connector elements 76 whereof each connector element is mutually insulated from each other and whereof the rows are disposed along the longitudinal edge portions of the socket member.

The connector elements 76 are generally elongated to provide a connecting lug 78 which extends from one face of the socket member 74 to provide for convenient connection into the circuit of the machine in which the unit is to be employed. The opposite end of each connector element 76 provides a contact pin or blade socket 80 which is composed of a pair of oppositely disposed spring fingers, each of which is curved outwardly to provide a laterally disposed entrance for the reception of a corresponding contact pin 32. Each pin socket 80 is recessed in a contact pin socket recess 82.

In order to bring the base terminal pins 32 into electrical contact with the pin sockets 80, the base 26 is brought into contact with the socket member 74 with the two in such longitudinal off-set relation that the pins 32 are laterally off-set with respect to respective sockets. A short, relative, longitudinal movement between the base 26 and the socket member 74 will then bring the pins 32 into proper engagement with their respective pin sockets 80.

In order that connection between the base elements and the socket elements may be facilitated, there has been provided on the socket member 74 a guide block 84 which is adapted to register with the walls of a guide slot 86 formed in one edge of the base member 26. The distance between the oppositely disposed slot walls 88 and 90 is only slightly greater than the distance between the end faces 92 and 94 of the guide block 84. Therefore, when the guide slot 86 is brought into embracing position with the guide block 84, the slot walls 88 and 90 will cooperate with the end faces 92 and 94 respectively to position the base 26 in slightly off-set position in a longitudinal direction in respect to the socket member 74. Thereafter, relative movement between the base 26 and the socket 48 in a longitudinal direction will effect secure contact of the contact pins 32 in their respective pin sockets 80.

The relative longitudinal movement between the base 26 and the socket member 74 necessary to effect electrical contact between the contact pins and the contact pin sockets is rendered possible by the fact that the guide block wall 94 is undercut as shown at 96 in Fig. 1 of the drawings, thus constituting the wall 94 a shoulder which is adapted, upon relative, longitudinal movement between the base 26 and the socket member 74, to enter a notch 98 in the end wall of the guide slot 86 of the base. To further insure that the base 26 and the socket member 74 are properly connected, the inner, longitudinal wall of the guide slot 86 is formed with an outwardly extending off-set 100 which is adapted to register with a corresponding recess 102 extending through the end wall 92 of the guide block 84.

When the contact pins or blades 32 and the contact pin sockets 80 are shifted into electrical contact, the shouldered wall 94 of the guide block 84 will lie within the notch 98 of the base guide slot 86. Accordingly, the structure just described also constitutes a means for securely holding the pins or blades 32 and the contact pin sockets 80 in contact with each other without danger of inadvertent separation.

The pluggable unit carries means for relatively shifting the base member 26 in respect to the socket member 74 in a longitudinal direction for engaging the pins with their respective pin sockets. There is provided for this purpose an operating cam 104 which is received with a fairly snug fit in a recess in the upper face of the base member 74. The cam 104 is fixed to the end of a shaft 106 which is adapted to rotate in the hollow post 34. The cam 104 is eccentrically mounted on the end of the shaft 106, and since the periphery of the cam is in contact with the walls of its receiving recess in the base member, it follows that rotation of the cam 104 in contact with such walls will cause relative, longitudinal movement between the base 26 and the socket member 74. This movement herein, in one direction of rotation, is just enough to cause displacement of the pins or blades 32 into contact with their respective pin sockets 80. A slot 108 in the end of the shaft 106 may be engaged with a suitable tool to cause rotation of the shaft and its cam 104.

To limit the rotary movement of the rod 106, there has been provided a stop pin 110 which extends laterally from the operating rod 106 at a point immediately above the head plate 10. The stop pin 110 is adapted to engage a pair of ears 112 and 114 that are upstruck from the face of the head plate 10. These ears are located in diametrically opposite position so that rotation of the rod 106 is limited to 180°.

In practical application the unit is moved in relation to the socket member 74 because ordinarily the position of the socket member 74 will be fixed. Herein the guide block 84 of the socket member has a through passage which is adapted to receive a bolt 116 (Fig. 2) by means of which the socket 74 may be attached to a bracket 118 which constitutes part of a general supporting frame 120.

While a specific form of construction has been shown herein for purpose of illustration, it is contemplated that changes may be made therein without departing from the claims that are to follow.

What is claimed is:

1. A pluggable unit for supporting electrical components, comprising a rigid structure including a head plate, a base member, a frame, and means rigidly interconnecting said head plate, said base member and said frame, a plurality of tube sockets mounted in said head plate, a first plurality of electrical terminals mounted in said frame in positions which are fixed with respect to and adjacent to said head plate to provide electrical connections for said sockets, a second plurality of terminals mounted in said frame in positions fixed with respect to said base member and adjacent thereto, at least one removable and replaceable support adapted to be carried by said frame and adapted to carry electrical components thereon, terminals carried by said support in solely frictional engagement with said first and said second plurality of terminals respectively for interconnecting electrical components carried by said support with said tube sockets into a circuit connected to said second plurality of terminals, the frictional engagement of said terminals as aforesaid serving at least in part to hold said support in a predetermined position with respect to said frame, and non-symmetrical interengaging mechanical means on said frame and on said support respectively for physically preventing said support from being disposed on said frame in a position in reverse of its desired position with respect thereto.

2. A pluggable unit in accordance with claim 1, in which said support is held in its position on said frame solely by frictional engagement of electrical terminals carried by said support engaging complementary electrical terminals carried by said frame.

3. A pluggable unit for supporting electrical components, comprising a rigid structure including a head plate, a base member, a frame, and means rigidly interconnecting said head plate, said base member and said frame, a plurality of tube sockets mounted in said head plate, a first plurality of terminals mounted in said frame at positions fixed in respect to said head plate and arranged in a first predetermined straight line, said first plurality of terminals providing electrical connections for said sockets, a second plurality of terminals mounted in said frame in positions fixed in respect to said base member and arranged in a second predetermined straight line which is parallel with said first straight line, at least two removable and replaceable supports adapted to be carried by said frame solely in predetermined positions in respect thereto and adapted to carry electrical components thereon, terminals carried by opposite parallel edges of each of said supports and arranged in solely frictional engagement with said first and said second plurality of terminals respectively for interconnecting electrical components carried by said supports and said tube sockets into circuits connected to said second plurality of terminals, the frictional engagement of said terminals as aforesaid serving at least in part to hold said supports at predetermined positions in respect to said frame, and means forming a part of each of said supports for interlocking with portions of said frame and with adjacent ones of said supports to prevent any of said supports from being placed in position on said frame in an arrangemen inverted in respect to the predetermined desired position thereof, so as to insure engagement of electrically related sets of contacts.

References Cited in the file of this patent

UNITED STATES PATENTS

| | | |
|---|---|---|
| 2,189,874 | Ziganke | Feb. 13, 1940 |
| 2,579,141 | Eckert, Jr. et al. | Dec. 18, 1951 |
| 2,637,763 | Palmer | May 5, 1953 |